United States Patent [19]

Inoue et al.

[11] 3,776,707

[45] Dec. 4, 1973

[54] PROCESS FOR PRODUCING TEMPERED GLASS SHEET

[75] Inventors: Touru Inoue; Kenzi Terashima, both of Nishinomiya, Japan

[73] Assignee: Nippon Sheet Glass Co., Ltd., Higashi-ku, Osaka, Japan

[22] Filed: Sept. 1, 1970

[21] Appl. No.: 68,634

[30] Foreign Application Priority Data
Sept. 4, 1969 Japan.............................. 44/70451

[52] U.S. Cl.................................... 65/29, 65/114
[51] Int. Cl............................................. C03b 27/00
[58] Field of Search.............................. 65/29, 114

[56] References Cited
UNITED STATES PATENTS

| | | | |
|---|---|---|---|
| 2,093,040 | 9/1937 | Eckert .................................. | 65/114 |
| 2,311,846 | 2/1943 | Littleton et al.................... | 65/114 X |

OTHER PUBLICATIONS

"Fracture of Toughened Glass Wall Cladding," I.C.I. House, Melbourne; E. R. Ballantyne; Commonwealth Scientific and Industrial Research Organization Division of Building Research, Report 06.1–5; 1961.

*Primary Examiner*—Arthur D. Kellogg
*Attorney*—Wenderoth, Lind and Ponack

[57] ABSTRACT

In a process for producing tempered glass sheet which includes a step of tempering treatment comprising heating a glass sheet to a temperature in the vicinity of its softening point and rapidly cooling the heated glass sheet from its surface, the improvement which comprises maintaining the glass sheet, before or after said tempering treatment, at a temperature in the range of 100° to 380°C. for a total period of time which meets the following formula $$\int_0^{H} 10^{-\frac{a}{T}} dH1$$

wherein T is a temperature in degrees centigrade at an optional time,
H is a time in minutes which is calculated when T is in the range of 100° to 380°C. and
$a$ is a number 250 after the tempering treatment and 540 before the tempering treatment,
thereby to impart a thermal history to the glass sheet, and removing those glass sheets which break by said thermal history and tempering treatment, whereby the remaining tempered glass sheets do not undergo spontaneous breakage.

18 Claims, 4 Drawing Figures

PROCESS FOR PRODUCING TEMPERED GLASS SHEET

This invention relates to a process for producing a tempered glass sheet, and more particularly, to a process for producing a tempered glass sheet by rapidly cooling a glass sheet heated to a temperature in the vicinity of its softening point.

A tempered glass sheet produced by rapidly cooling the surface of a glass sheet heated to a temperature near its softening point sometimes breaks spontaneously even without any large external force, although this is very rare. This phenomenon is called "spontaneous break" or "self-destruction" of the tempered glass sheet. It is said that the self-destruction occurs presumably owing to minute foreign matter present in a tensile stress layer existing in about 2/3 of the internal portion of the tempered glass sheet. It has been reported that especially when spherical fine particles of nickel sulfide are present, the crystalline transition from $\alpha$-NiS to $\beta$-NiS occurs during the use of the tempered glass sheet, and the destruction of the glass occurs because of a volume change during this transition.

It has now been found that a very small proportion of minute foreign matter present in the tensile stress layer of a tempered glass sheet has such defects as strain or fine cracks, and such defective particles become the cause of self-destruction. We have further discovered that minute foreign matter of nickel sulfide, even when having no strain nor cracks at an early stage of use, produces strain or cracking in the course of use by the transition from $\alpha$-NiS to $\beta$-NiS, and becomes the cause of self-destruction. It has been confirmed, on the other hand, that chromite, gas bubbles, salt bubbles, or minute foreign matter not containing strain and cracks, which are usually contained in the sheet glass, do not lead to the self-destruction.

The minute foreign matter which become the cause of self-destruction are very fine with a diameter of about 0.3 mm to 0.05 mm and occur in glass product with a very low probability. Therefore, it is difficult to discover it.

Heretofore, to guarantee the strength of quality of tempered sheet glass, a test has been made by letting a steel ball fall from a certain height onto a glass sheet to bring it into collision with the glass sheet. This test can determine the strength of the tempered glass sheet, but does not result in guaranteeing the quality of glass against self-destruction.

Since it is extremely difficult to detect a microscopic foreign matter by the inspection of all glass sheets and to remove a glass sheet containing such specific foreign matter which become the cause of self-destruction, such an inspection step cannot be incorporated in the production of tempered glass sheet.

Accordingly, an object of the present invention is to provide a process for producing tempered glass sheet which is not likely to break spontaneously.

Another object of the invention is to provide a process for breaking and removing these tempered glass sheets which are likely to break spontaneously, before delivery of these glass sheets as final products.

These objects of the invention can be achieved by maintaining a glass sheet, before or after being tempered by heating and rapid cooling, at a specific temperature for a specific period of time thereby to impart a thermal history to the glass.

The temperature and time relation mentioned above is such that the heating temperature is in the range of 100° to 380°C. and the heating time is the period which meets the following formula $$\int_0^H 10^{-\frac{a}{T}} dH \geq 1$$

wherein T is a temperature in degrees centigrade at an optional time,
H is a time in minutes which is calculated when T is in the range of 100° to 380°C and
$a$ is a number 250 after the tempering treatment and 540 before the tempering treatment.

For convenience of description, the term "accelerating" is used to express the imparting of a thermal history to a glass sheet by maintaining it at the temperature specified and for the time specified. The "accelerating" after the tempering treatment of glass sheet is termed "post-accelerating", and the "accelerating" prior to the tempering treatment, "pre-accelerating".

By "accelerating", cracks around the foreign matter in a glass sheet are grown artificially, and the transition of the nickel sulfide from $\alpha$-NiS to $\beta$-NiS is promoted artificially. By so doing, the glass sheet which will be spontaneously broken is broken at an early stage by the tensile stress which has been generated in an interlayer of the glass sheet by the tempering treatment. Accordingly, the "accelerating" in the present invention may be performed either before or after the tempering treatment of the glass sheet.

Products still not broken after accelerating in the case of the process including post-accelerating or after the subsequent tempering treatment in the case of the process including pre-accelerating may further be rapidly heated at a temperature of 300°C. to 950°C. for 10 to 300 seconds so as to more strictly break and remove those tempered glass sheets which are likely to break spontaneously in the course of use. However, tempered glass made by the process of the tempering treatment and the accelerating will not be spontaneously broken during use in a normal condition even if it has not been subjected to this rapid heat-treatment.

The first step of the process including post-accelerating in accordance with this invention comprises a step of producing a tempered glass sheet, as heretofore practised, in which a glass sheet is heated as uniformly as possible to a temperature in the vicinity of the softening point of the glass sheet, and thereafter, it is rapidly cooled from its surface to produce a tempered glass sheet. This rapid cooling is usually performed by means of a cooling medium, for instance by blowing air at room temperature against both surfaces of the glass sheet.

The second step of the process including post-accelerating in accordance with this invention is a step in which the tempered glass sheet is subjected to the "accelerating" to promote the transition from $\alpha$-NiS to $\beta$-NiS of nickel sulfide, whereby minute cracks or strains are generated near the fine foreign matter of nickel sulfide, or the cracks near the foreign matter are grown.

Heating in the second step must be performed at a temperature in the range of 100° to 380°C. for a time defined by the following equation $$\int_0^H 10^{-\frac{250}{T}} dH \geq 1 \quad (IA)$$

If the heating temperature is lower than 100°C., the transition of nickel sulfide from α-NiS to β-NiS proceeds with considerable difficulty, and it is impossible to break a tempered glass sheet containing nickel sulfide. Temperatures in excess of 380°C. do not cause the transition of the nickel sulfide from α-NiS to β-NiS.

The aforementioned formula (IA) obtained experimentally defines the heating temperature and time of thermal history in the post-accelerating method. The accelerating in accordance with this definition embraces various embodiments mentioned below. A first embodiment is one wherein the heating temperature is maintained constant during the time of maintaining glass sheet in the "accelerating" condition. In this case, the formula (IA) is expressed as $10^{-250/T} \Delta H \geq 1$. Table 1 below shows preferred conditions of accelerating at a constant temperature.

TABLE 1

| Heating temperature (°C.) | Time (minutes) |
|---|---|
| 100 | 320 and above |
| 150 | 45 and above |
| 200 | 18 and above |
| 250 | 10 and above |
| 300 | 7 and above |
| 350 | 5 and above |

A second embodiment is one wherein the heating temperature varies between 100°C. and 380°C. during a continuous time of maintaining glass sheet. In this case, the temperature, being the function of time, is expressed as $T=f(H)$, and the above formula (1A) is expressed as $$\int_0^H 10^{-\frac{250}{f(H)}} dH \geq 1$$

The actual heating time is determined by the integration of this formula. If the temperature change is complicated and the solution of the formula $$\int_0^H 10^{-\frac{250}{f(H)}} dH \geq 1$$

can not be obtained even by the approximating method, the calculation may be made on the basis of $$\sum_{i=1}^{n} 10^{-\frac{250}{Ti}} \Delta Hi \geq 1$$

(where Δ Hi is any unit time, and Ti is a temperature at Δ Hi). When the time of "accelerating" is determined by such summation, it is desirable to use one minute as the minimum unit of Δ H. As examples of preferred conditions, the tempered glass sheet is heated for more than 10 minutes at a temperature varying within the range of 250° and 380°C.; or heated for more than 320 minutes at a temperature in the range of 100°C. to 150°C.

A third embodiment is one in which the heating temperature is either lower or higher than the range of 100°C to 380°C. for a certain period during the continuous heating time, and for the rest of the period, the temperature is in the range of 100°C to 380°C. In this case also, formula (IA) is expressed as $$\int_0^H 10^{-\frac{250}{f(H)}} dH \geq 1,$$

but only the time during which the temperature is in the range of 100° to 380°C. is used in the calculation. In other words, the temperature of "accelerating" according to the present invention need not be in the range of 100° to 380°C. throughout the entire period of the continuous heating time, but the sum of the periods during which the temperature is in the range of 100 C° to 380°C. is of importance. The tempered glass should not be maintained continuously for more than 5 minutes at a temperature exceeding 380°C. Part of the NiS is converted to α-NiS at a temperature above 380°C., and the effect of accelerating is not produced.

A fourth embodiment is one in which a glass sheet is rapidly cooled from the temperature around its softening point down to 300° to 200°C., and subsequently, heated at a temperature in the range of 380°C to 100°C. for a time defined by the formula $$\int_0^H 10^{-\frac{250}{T}} dH \geq 1.$$

As the heating equipment used of second step in the post-accelerating, an ordinary gas furnace, an electric furnace, a hot air furnace, and a salt-bqth furnace can be used to heat the glass uniformly at a predetermined temperature.

By the post-accelerating method of the invention, nickel sulfide which becomes the cause of self-destruction under normal service conditions changes in its volume by the transition from α-NiS to β-NiS, and other cracks and strain resulting from the presence of the aforementioned specific foreign matter which become the cause of destruction grow; therefore, almost all glass sheets containing these specific foreign matters break. However, it is preferred to perform a third step to be described below in order to break completely those glass sheets which are likely to break in the course of use owing to the self-destruction phenomenon.

The third step of the process of the invention involves temporarily increasing the tensile stress remaining inside the tempered glass sheet which has been subjected to the first and second steps, thereby to break the tempered glass sheets which have the causes of self-destruction but have not been broken even after the second step. Increasing the tensile stress inside the glass temporarily can be effected by applying a bending moment to the tempered glass sheet or pulling the glass sheet from both ends with strong force. But this can be easily accomplished by rapidly heating the glass sheet from its surface so that there is a temperature difference between the surface and the inside of the glass sheet. The easiest way of this rapid heat-treatment is to conduct the tempered glass sheet to a heating oven maintained at a temperature between 300°C. and 950°C., preferably from about 300°C. to 700°C. In this treatment, the heated glass sheet must be withdrawn from the oven before the surface temperature of the glass sheet reaches the strain point of the glass so that the heating will not result in alleviating the compressive stress on the surface layer which has been formed in the first step. The time during which the tempered glass is made to stay in the heating oven varies according to such factors as the size of the glass sheet or the heat capacity of the heating oven, but generally in the range of from 10 to 300 seconds.

It is to be noted that no strict inspection for specific foreign matter makes it possible to divide the glass sheets into those which will break spontaneously in the second step and those which will break spontaneously in the third step. Almost all of the glass sheets having the specific foreign matter break spontaneously in the second step, but it cannot be said definitely that all of them break in the second step.

The post-accelerating method of this invention has made it possible to produce tempered glass sheets which are not likely to break spontaneously, without resorting to complicated inspection.

Another advantage of the post-accelerating method of the invention is that even if some alleviation of internal stress is caused by the heat-treatment of the tempered glass sheet in the second step, the unevenness of tempering caused in the first step of the production of tempered glass can be remedied by this heat-treatment, and thus a tempered glass having a uniform distribution of strength can be produced.

In the pre-accelerating method of this invention, accelerating precedes the tempering treatment. As previously stated, the pre-accelerating method of the invention is practised by maintaining a glass sheet at a temperature of 100° to 380°C for a time defined by the following formula $$\int_0^H 10^{-\frac{540}{T}} dH \geq 1 \qquad (IB)$$

The pre-accelerating method includes an embodiment wherein the glass sheet is maintained at a constant temperature within the range of 100° to 380°C. for a time defined by the above formula, an embodiment wherein the glass sheet is maintained at a temperature varying within the range of 100° to 380°C., and an embodiment wherein the glass sheet is maintained at a temperature either lower or higher than the range of 100° to 380°C. for a certain period of the continuous time of heating, and is maintained for the rest of the time at a temperature within this specified range.

Table 2 shows one example of preferred conditions when the heating is performed at a constant temperature in the pre-accelerating method. Needless to say, these conditions meet the formula $$\int_0^H 10^{-\frac{540}{T}} dH \geq 1 \text{ or } 10^{-\frac{540}{T}} \cdot H \geq 1$$

TABLE 2

| Temperatre (°C.) | Time (minutes) |
|---|---|
| 100 | more than 250,000 |
| 150 | more than 4,000 |
| 200 | more than 500 |
| 250 | more than 120 |
| 300 | more than 60 |
| 330 | more than 60 |
| 370 | more than 60 |

In the production of glass sheets, hot glass melted in a glass-melting furnace and formed in the shape of a continuous ribbon is annealed by passing it through a lehr. The pre-accelerating method of this invention can be practised during this annealing procedure. In order to perform the pre-accelerating of the invention during annealing, it is desirable to maintain the glass sheet for at least 100 minutes at a temperature in the range of 380° to 200°C. in a manner such as to meet the formula IB.

This temperature range is not restricted to a range of 380° to 200°C., and may be a range of 380° to 100°C. If the temperature is below 200°C., the "accelerating" time becomes exceedingly long, and it is not feasible in the lehr.

As the heating equipment for practising the pre-accelerating method of the invention, various heating furnaces such as an ordinary gas furnace, an electric furnace, a hot air furnace, a salt-bath furnace and an oil-bath furnace can be used.

The second step of the process including pre-accelerating consists of a step of producing tempered glass which has been conventionally practised. In this step, the glass sheet heated in the first step is heated rapidly and uniformly to a temperature in the vicinity of its softening point, and is rapidly cooled from its surface to form a tempered glass sheet. Usually, air at room temperature is used as a cooling medium in this rapid cooling procedure, and this air is blown uniformly against both surfaces of the heated glass sheet.

In the manner described, the method of the present invention has made it possible to produce a tempered glass sheet which is not likely to break spontaneously in the course of use, without the need for any particular inspection. In the practice of the pre-accelerating method of the present invention, after the end of the heat-treatment in the first step, the second step is followed and the glass sheet is heated to a temperature in the vicinity of its softening point; or after the end of the heat-treatment in the first step, the glass sheet is cooled to room temperature, and then such cooled glass sheet is subjected to the second step. Both of these procedures are within the scope of the present invention.

In the pre-accelerating method, as in the post-accelerating method, it is preferred to practise the third step immediately subsequent to the first and second steps.

In the conventional production of tempered glass sheets, the glass sheets are heated by such methods as one in which there is used a single heating furnace maintained at a temperature near the softening point of the glass sheet, one in which there is used a section furnace consisting of a single heating furnace and one or several pre-heating furnaces connected thereto, or one in which there is used a continuous heating furnace having temperature regions from room temperature up to around the softening point of the glass sheet. In any case, the main object of heating is a preparation for the subsequent rapid cooling step and is intended to heat the glass sheet rapidly and uniformly to a temperature in the vicinity of the softening point of the glass sheet. Hence, the residence time of the glass sheet in the heating furnace is relatively short, and is generally from several minutes to about 10 minutes in total, although varying in accordance with such factors as the size of the glass sheet and the heat capacity of the furnace. For instance, in the conventional production of tempered glass sheets the preheating is done usually at a temperature of 400° to 500°C. for a time not exceeding 5 minutes. When this is calculated from $$\int_0^H 10^{-\frac{540}{T}} dH$$

defined in the present invention, it is less than 0.3.

The step of rapidly cooling a glass sheet heated to a temperature around its softening point, from its surface is intended to produce tempered glass provided with the desired permanent strain, with good efficiency without breaking the glass sheet due to a temporary strain generated at the time of rapid cooling.

As mentioned above, in the conventional processes of producing tempered sheet glass, pre-heating, if at all carried out, is intended to produce a tempered sheet glass with good efficiency, and the essential point is only heating and rapid cooling in the tempering treatment. No consideration has been given, as in the present invention, to the prevention of the self-destruction of tempered glass sheets. Accordingly, such conventional processes cannot lead to the prevention of the self-destruction phenomenon described above.

In the production of sheet glass, the sheet is slowly cooled to room temperature after being formed at high temperatures, like glass articles in general. The annealing temperature of the glass sheet is generally from 450°C. to 550°C. Within this temperature range, strict temperature control is exercised. In the case of using a lehr, a relatively strict temperature control is performed at a temperature below the annualing temperature to control the rate of cooling of glass. Therefore, in the ordinary method of producing glass sheet, the glass sheet is maintained for a certain time at a temperature in the range of 100° to 380°C. in the annualing step. However, the residence time in this step is shorter than the heating time used in the pre-accelerating time described above. For instance, in the production of sheet glass by the Colburn process, the residence time of glass sheet in a lehr is 20 to 40 minutes at a temperature in the range of 100° to 380°C. In the Fourcault process, the residence time is shorter than the former, and in the Floating process, it is 15 to 60 minutes. With such residence times, however, the transition of NiS from α-NiS to β-NiS and the growth of cracks around minute foreign matter does not occur sufficiently, and tensile stress caused in the internal layer of glass sheet in the subsequent tempering treatment is not sufficient to break during the tempering treatment those glass sheets which are likely to break spontaneously during the course of use.

Table 3 shows one example of an average rate of cooling on the Floating process at the time when a glass ribbon passes through a lehr at a temperature in the range of 380° to 100°C., and the values obtained by substituting it for the formula $$\int_0^H 10^{-\frac{540}{T}} dH$$

of the present invention. As is shown in the table, these values are far smaller than 1, and show that by the conventional annealing operation, the objects of the present invention cannot be achieved.

TABLE 3

| Thickness of glass (mm) | Cooling rate at 380–100°C. (°C./min.) | $\int_0^H 10^{-\frac{540}{T}} dH$ |
|---|---|---|
| 6 | 17.8 | 0.163 |
| 8 | 12.1 | 0.240 |
| 10 | 9.7 | 0.299 |
| 12 | 8.1 | 0.358 |
| 15 | 6.4 | 0.454 |
| 19 | 5.2 | 0.558 |

As is seen from the foregoing, in order to break those tempered glass sheets which are likely to break spontaneously in the course of use, before delivery as final products, it is necessary that the glass sheets should be maintained at a temperature within the specified range of this invention for a time within the specified range of this invention. The present invention which has revealed the temperature-time relation above described produces marked effects or advantages in the production of tempered glass.

The following test was conducted to ensure that tempered glass sheets produced by the process of the invention will not break spontaneously in the course of use. Glass sheets are subjected to he irradiation of an infrared lamp with 3,500 Kcal/m²·hr which corresponds to about 5 times the energy of sunlight intermittently for a total time of at least 1,000 hours. The irradiation time corresponds to at least 6 years in term of the irradiation of sunlight in the daytime. All of the tempered glass sheets which break spantaneously when subjected to said irradiation contain the specific foreign matter which have been found to be the cause of self-destruction by the invetigation of a number of tempered glass sheets. Those which do not break by the above test do not contain the specific foreign matter. We could say therefore that the determination of possible self-destruction by this test substantially shows the possibility of natural self-destruction. For the convenience of description, this test will be referred to as test A.

The specific method of practising the invention will be described with reference to the accompanying drawings in which.

EXAMPLE 1

Glass sheet samples having a thickness of 12 mm and an ordinary composition of sheet glass were prepared as follows:

Five glass sheets containing the specific minute foreign matter wich become the cause of self-destruction (designated as sample A);

Five glass sheets containing minute chromite particles which do not become the cause of elf-destruction (designated as sample B); and Fifty glass sheets which do not contain other than minute gas bubbles (designated as Sample C).

The inspection was made precisely by the naked eye.

Figure 1:
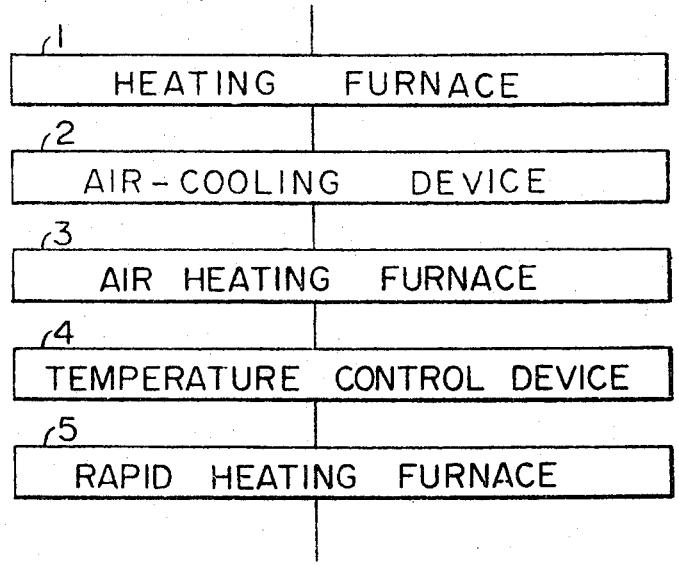
FIG. 1 is a view showing the arrangement of apparatus for practising the post-accelerating method according to this invention.

Each of these glass sheet samples was heated to a temperature in the range of 650° to 700°C. by the tempering heating furnace 1 shown in FIG. 1, and then rapidly cooled down to less than 100°C. over a period of about 5 minutes by blowing air at room temperature by means of an air cooling device 2. By this treatment, the glass sheet sample was made to have a compressive stress layer at the surface, and a tensile stress layer at the inside, and because of the presence of the surface compressive stress layer, the glass sheet had a strength more than several times as large as ordinary glass sheet of the same thickness.

Figure 2:
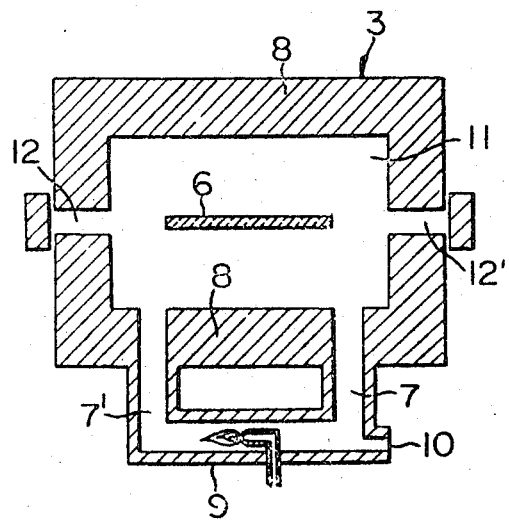
FIG. 2 is a view showing the air heating furnace shown in FIG. 1–3.

Each of the glass sheets was then conducted to an air heating furnace 3 at 330°C. As shown in FIG. 2, the air heating furnace 3 is adapted to circulate hot air, and circulating passages 7 and 7' are provided through a furnace wall 8, with a burner 9 fitted in the passages. An air intake is shown at 10. Air taken from intake 10 is heated by means of the burner 9, and fed to a heating chamber 11 via the passage 7'. Part of the air in the heating chamber 11 is returned through the passage 7, and again heated by means of the burner 9. Thus, the heated air is again fed to the heating chamber 11, thereby maintaining the temperature of the heating chamber 11 substantially constant. Glass sheet 6 is fed from an inlet 12 to the heating chamber 11, and supported by a suspending member (not shown) provided at the upper part of the heating chamber 11. After being maintained for a certain period of time within the heating chamber 11, the glass sheet is delivered from an outlet 12'. Some of the air within the heating chamber 11 escapes from the inlet 12 and the outlet 12'.

In this Example, the temperature of the heating chamber 11 was maintained at 330°C., and the glass sheet 6 was maintained for 7 minutes in the heating chamber 11. Under these conditions, the value of $$\int_0^H 10^{-\frac{250}{T}} dH$$

becomes 1.2, and thus meets the formula (IA).

Figure 3:
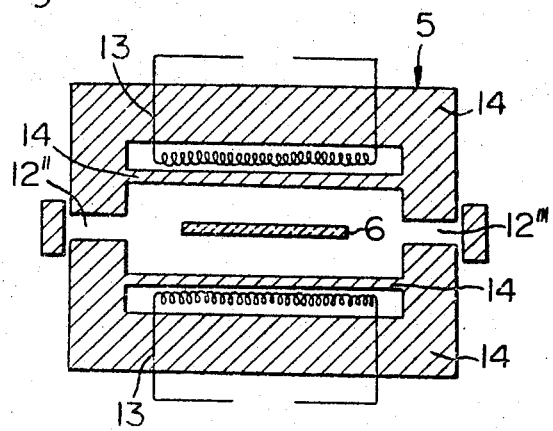
FIG. 3 is a view showing the rapid heating furnace shown in FIG. 1–5.

Each of the glass sheet samples was then cooled to room temperature by means of a temperature control device 4, and then conducted to a rapid heating furnace 5 maintained at 670°C. After allowing it to stay in the furnace for about 45 seconds, it was taken out of the furnace. The rapid heating furnace 5, as is shown in FIG. 3, is an electric furnace adapted to heat glass sheet by a nichrome wire heat-generating body 13, and is of a double wall type structure in order to avoid heat radiation above the predetermined temperature. In FIG. 3, a furnace wall is shown at 14, and the inlet and outlet of the glass sheet 6 are designated at 12'' and 12'''.

In this Example, four samples out of the five samples A were broken in the second step, namely in the "accelerating" step at a temperature of 330°C., and in the rapid heat treatment in the electric furnace at 670°C., the remaining one sample was broken. On the other hand, samples B and samples C were not broken at all in any of the process steps. Furthermore, samples A and B did not spontaneously break in the test A.

EXAMPLE 2

The tempering treatment was performed in the same manner as set forth in Example 1, and various accelerating procedures were followed so as to meet the conditions of $$\int_0^H 10^{-\frac{250}{T}} dH$$

in the air heating furnace, thereby to produce tempered glass sheets which did not break spontaneously. The self-destructing properties of the tempered glass sheets obtained were examined by the test A. The number of samples was 5 for sample A and 10 for sample C. In this Example, heating by the rapid heating furnace was not carried out, as in Example 1. For the sake of comparison, the treatment was carried out under the conditions which were outside the definition of the formula $$\int_0^H 10^{-\frac{250}{T}} dH \geq 1.$$

The results are shown in Table 4.

TABLE 4

| Conditions of post-accelerating | | Heating time (total time in minutes at 100–380° C.) | $\int_0^H 10^{\frac{250}{T}} dH$ | Number of glass sheets broken spontaneously during production | | Number of glass sheets broken spontaneously by test A | |
|---|---|---|---|---|---|---|---|
| Heating temperature (° C.) | Heating method | | | Sample A | Sample C | Sample A | Sample C |
| 100 | Constant temperature | 340 | 1.1 | 4 | 0 | 1 | 0 |
| 250 | do | 10 | 1.0 | 5 | 0 | 0 | 0 |
| 350 | do | 5 | 1.0 | 4 | 0 | 1 | 0 |
| 250–380 | Heated at 13° C./min | 10 | 1.5 | 5 | 0 | 0 | 0 |
| 150–100 | Cooled at 0.16° C./min | 320 | 3.5 | 4 | 0 | 1 | 0 |
| 350–400 | Heated to 380–400° C. for about 30 seconds during a period of 3 minutes. | 15 | ¹ 2.0 | 5 | 0 | 0 | 0 |
| 400 | Constant temperature | 5 | | 0 | 0 | 5 | 0 |
| 90 | do | 1,000 | 0.8 | 0 | 0 | 5 | 0 |
| 250 | do | 7 | 0.7 | 1 | 0 | 4 | 0 |
| 250–380 | Heated at 30° C./min | 4 | 0.7 | 0 | 0 | 5 | 0 |

¹ Or more.

EXAMPLE 3

Five samples A, five samples B and 20 samples C were prepared from glass sheets of ordinary composition having a thickness of 15 mm, a length of 2 m and a width of 2 m. Each of the glass sheets was heated to a temperature of 650° to 700°C. by the tempering heating furnace 1 shown in FIG. 1, and then cooled down to 200°C. over a period of about 4 minutes by blowing air at about 50°C. by means of the air cooling device 2. Subsequently, high temperature air at 250°C. was introduced into the air cooling device to heat the glass sheet at this temperature for about 30 minutes. Under these conditions, the value of $$\int_0^H 10^{-\frac{250}{T}} dH$$

was 3.0 which meets the formula (IA). During this time, there was no breakage among the samples B and C. One sample A broke spontaneously after a lapse of 10 minutes, one after a lapse of 12 minutes, and another one after a lapse of 15 minutes. The test A was performed on the remaining samples A, five samples B, and 20 samples C. One of the samples A broke spontaneously, and the other did not break at all.

EXAMPLE 4

Glass sheet samples having a thickness of 12 mm and an ordinary composition of sheet glass were prepared as follows:

Five glass sheets containing specific minute foreign matter which become the cause of self-destruction (Sample A);

Five glass sheets containing minute chromite particles which do not become the cause of self-destruction (Sample B); and Fifty glass sheets which do not contain foreign matter other than minute gas bubbles (Sample C).

The inspection was made precisely by the naked eyes.

Figure 4:
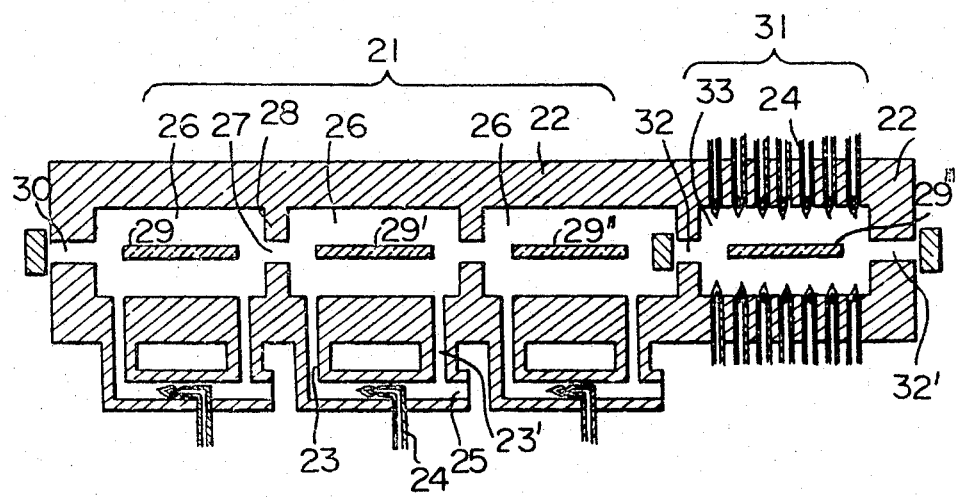
FIG. 4 is a view showing a furnace for practising the preaccelerating method of the present invention.

Each of the glass sheet samples was continuously heated by the heating furnace shown in FIG. 4, and cooled down to about 100°C. by the air blowing device over a period of 6 minutes to form tempered glass sheets.

The heating furnace shown in FIG. 4 was of a divided structure, and the pre-accelerating and tempering treatment of the glass sheet were continuously practised without cooling halfways.

Referring to FIG. 4, the heat-treatment furnace is shown at 21, and has a wall 22 made of refractory brick. The furnace is adapted to a heat glass sheet by circulating hot air. Passages 23 and 23' for hot air are provided through the furnace wall 22, and a burner 24 is fitted in these passages. The air taken from an air intake 25 is heated by the burner 24, and fed to a heating chamber 26 through the passage 23. Part of the hot air in the heating chamber 26 is returned through the passage 23', again heated by the burner 24, and introduced into the heating chamber 26. By circulating hot air in this way, the temperature and the temperature distribution of the heating chamber 26 can be maintained constant. The inside of the heat-treatment furnace 21 for accelerating is partitioned into three sections by partition walls 28 having a slit 27. Three heating chambers 26 of the same construction are provided in juxtaposition and connected to one another. Each of the three sections includes an independent system for generating hot air and circulating it, and therefore, it is possible to control the temperature of one section without affecting the heating in the other sections. Glass sheet 29 is supported by a suspending member (not shown) provided on the upper part of the heating furnace, and is fed from an inlet 30 to the heating chamber 26, where the glass sheet is heated for a predetermined period of time. Thereafter, the glass sheet is gradually transferred to the positions of glass sheets 29' and 29'', and heated. The glass sheet 29'' heat-treated thoroughly in the three heating chambers 26 is fed into the tempering heating furnace 31 through its entrance 32. The tempering heating furnace 31 includes a plurality of burners 24 extending through the furnace wall 22. In the tempering heating furnace 33, the glass sheet 29''' is heated to a temperature in the vicinity of the softening point of the glass sheet, and delivered from the exit 32'. Thereafter, it is rapidly cooled by an air blowing device (not shown). Some of the hot air in the heating chambers 26 and 33 escapes from the inlets and outlets 30, 32, and 32'. The glass sheets are successively and continuously heated at the positions of the glass sheets 29, 29', 29'', and 29''' shown in FIG. 4, thereby to produce tempered glass sheets rapidly.

In this Example, the temperature of the heating chamber 26 at the heat-treating part for accelerating was 300°., and the temperature of the tempering heating chamber 33 C., 670°C. The residence time of the glass sheet in each heating chamber was 22 minutes. Therefore, the total time of heat-treatment at 300°C. was 66 minutes. Under these conditions, the value of $$\int_0^H 10^{-\frac{640}{T}} dH$$

is 1.0, and meets the formula (IB). In this Example, two out of five glass sheet samples containing the specific minute foreign matter which become the cause of self-destruction broke in the tempering heating chamber 33, and two samples broke in the air blowing device. On the other hand, five samples which contained minute chromite particles not causing self-destruction and fifty samples containing no foreign matter other than minute gas bubbles did not break throughout the entire process steps. These glass sheets did not change at all in their surface condition, and became tempered glass sheets quite equivalent to those obtained by the prior art processes.

One remaining sample sheet (Sample A) was introduced into a rapid heating furnace 5, and made to stay there for 200 seconds at 500°C. The glass sheet so treated broke after a lapse of about 180 seconds.

The 55 samples which became tempered glass sheets in accordance with the procedure of this Example did not break spontaneously even after the test A, the cold-warm temperature cycle test at below 150°C. over long periods of time, or the repeated bending moment test.

EXAMPLE 5

In the same manner as in the preceding Examples, five samples A, five samples B, and fifty samples C were prepared. Each of the sample sheets was heat-treated at 300°C. for 66 minutes in a heat-treatment furnace of hot air heating type which had substantially the same structure as the heat-treating furnace 21 shown in FIG. 4. Thereafter, the glass sheet was cooled down to room temperature, and allowed to stand for 2 days at room temperature. Then the glass sheet was heated for 3 minutes at 670°C. in a heating furnace corresponding to the tempering heating furnace chamber 11 shown in FIG. 2, and cooled over a period of 6 minutes at 100°C. As a result, all five samples A broke spontaneously in the tempering furnace, but other samples were obtained as tempered glass sheets, which did not spontaneously break in the test A performed thereafter.

EXAMPLE 6

Tempered glass sheets were produced by the pre-accelerating method by a dividend type heating furnace shown in FIG. 4. The "accelerating" was performed before the tempering treatment by heat-treating the glass sheets under various conditions indicated above and meeting the formula $$\int_0^H 10^{-\frac{540}{T}} \geq 1.$$

The tempering treatment was followed without cooling the glass sheets as in Example 5. The number of samples in each run was five samples A, and 10 samples C. In this case, heating in the rapid heaing furnace was not carried out. The self-destructing properties of the resulting tempered glass sheets were examined by the test A. The results are shown in Table 5. The table also shows the results of the treatment outside the definition.

TABLE 5

| | Conditions of pre-accelerating | | | Number of glass sheets broken spontaneously during production | | Number of glass sheets broken spontaneously by test A | |
|---|---|---|---|---|---|---|---|
| Heating temperature (° C.) | Heating method | Heating time (total time in minutes at 100-380° C.) | $\int_0^H 10^{-\frac{540}{T}}dH$ | Sample A | Sample C | Sample A | Sample C |
| 100 | Constant temperature | 250,000 | 1.0 | 4 | 0 | 1 | 0 |
| 370 | do | 60 | 1.1 | 5 | 0 | 0 | 0 |
| 380-100 | Cooled at 1° C./min | 280 | ¹2.0 | 5 | 0 | 0 | 0 |
| 100-380 | Heated at 1° C./min | 280 | ¹2.0 | 5 | 0 | 0 | 0 |
| 250-380 | Heated at 10° C./min. and cooled at 3° C./min | 100 | ¹1.2 | 4 | 0 | 1 | 0 |
| 100 | Constant temperature | 150,000 | 0.6 | 0 | 0 | 5 | 0 |
| 370 | do | 40 | 0.7 | 0 | 0 | 5 | 0 |
| 400 | do | 5 | | 0 | 0 | 5 | 0 |
| 350-400 | At every ten minutes heated at 350-400° C. for about 30 seconds or less. | 100 | >1.2 | 4 | 0 | 1 | 0 |

¹ Or more.

We claim:

1. A process for producing tempered glass sheets and for simultaneously accelerating the crystalline transition of any nickel sulfide impurities which may be present in said glass sheets, thus causing early spontaneous breaking of any of said sheets containing said nickel sulfide impurities, said process comprising the steps of:
   A. tempering said glass sheets by heating each of said glass sheets to a temperature in the vicinity of its softening point, and rapidly cooling each thus heated glass sheet from its surface; and
   B. maintaining the glass sheet after said tempering within the temperature range of 100° to 380°C. for at least a total period of time H which meets the following formula:

$$\int_0^H 10^{-\frac{250}{T}} dH \geq 1$$

wherein T is the temperature in degrees centigrade at a given time, H is the time in minutes at which T is within said range of from 100° to 380°C; thereby accelerating the crystalline transition and resultant volume change of any of said nickel sulfide impurities present in said glass sheets, thereby causing said glass sheets having said nickel sulfide impurities therein to spontaneously break during processing.

2. A process as claimed in claim 1, wherein after said tempering, said glass sheet is maintained at a temperature in the range of 250° to 380°C. for a time totalling 10 minutes or more.

3. A process as claimed in claim 1, wherein after said tempering, said glass sheet is maintained at a temperature in the range of 100° to 150°C. for a total time of 320 minutes or more.

4. A process a claimed in claim 1, wherein after said tempering, said glass sheet is maintained at a temperature of 150° to 250°C. for a total time of 45 minutes or more.

5. A process as claimed in claim 1, wherein, after said tempering, said glass sheet is maintained at a constant temperature in said range of 100° to 380°C. for said time period.

6. A process as claimed in claim 1, wherein, after said tempering, said glass sheet is maintained at a temperature varying between 100°C. and 380°C. for said time period.

7. A process as claimed in claim 1, wherein, after said tempering, said glass sheet is maintained at a temperature without said temperature range of 100° - 380°C. for a certain interval during a continuous time of maintenance, and at a temperature within said range of 100° to 380°C. for the rest of said continuous time.

8. A process as claimed in claim 1, wherein said step of rapidly cooling lowers said glass sheet to a temperature in the range of from 300° to 200°C.

9. A process as claimed in claim 1, further comprising the step of:
   C. after said step of maintaining, rapidly heating, at least once, the so treated glass sheet in a heating furnace maintained at a temperature of 300° to 950°C for 10 seconds to 300 seconds.

10. A process for producing tempered glass sheets and for simultaneously accelerating the transition of any nickel sulfide impurities which may be present in said glass sheets, thus causing spontaneous breaking of any of said sheets containing said nickel sulfide impurities, said process comprising the steps of:
    A. maintaining each of said glass sheets within the temperature range of 100° to 380°C. for at least a total period of time which meets the following formula:

$$\int_0^H 10^{-\frac{540}{T}} dH = 1$$

wherein T is the temperature in degrees centigrade at a given time,
    H is the time in minutes which is calculated when T is within said range of 100° to 380°C.; and
    B. tempering said glass sheets by heating each of said glass sheets to a temperature in the vicinity of its softening point, and rapidly cooling each thus heated glass sheet from its surface;

thereby accelerating the transition of any of said nickel sulfide impurities present in said glass sheets, and thus separating any glass sheet capable of spontaneous breaking by causing it to break during processing.

11. A process as claimed in claim 10, wherein said glass sheet, before said tempering, is maintained at a temperature in the range of 100° to 200°C. for a time totalling 250,000 minutes or more.

12. A process as claimed in claim 10, wherein said glass sheet, before said tempering, is maintained at a temperature in the range of 200° to 300°C. for 500 minutes or more.

13. A process as claimed in claim 10, wherein said glass sheet, before said tempering, is maintained at a temperature in the range of 300° to 370°C. for 60 minutes or more.

14. A process as claimed in claim 10, wherein said glass sheet, before said tempering, is maintained at a constant temperature in said range of 100° to 380°C. for said time.

15. A process as claimed in claim 10, wherein said glass sheet, before said tempering, is maintained at a temperature varying between 100°C. and 380°C. for said time.

16. A process as claimed in claim 10, wherein said glass sheet, before said tempering, is maintained at a temperature without said temperature range of 100° – 380°C. for a certain interval during a continuous time of maintenance, and at a temperature within said range of 100° to 380°C. for the rest of said continuous time.

17. A process as claimed in claim 10, wherein, before said tempering, said glass sheet is maintained during an annealing process followed its formation at a temperature in the range of 200° to 380°C. for at least 100 minutes.

18. A process as claimed in claim 10, further comprising the step of:

C. after said tempering, rapidly heating, at least once, the so treated glass sheet in a heating furnace maintained at the temperature of 300° to 950°C. for 10 seconds to 300 seconds.

* * * * *